(12) United States Patent
Nakamura et al.

(10) Patent No.: US 12,415,932 B2
(45) Date of Patent: Sep. 16, 2025

(54) WATER-BASED PAINT, CERAMICS, AND METHOD OF DECORATION

(71) Applicants: EHIME PREFECTURE, Ehime (JP); DAIO PAPER CORPORATION, Ehime (JP)

(72) Inventors: Kenji Nakamura, Ehime (JP); Toshihiro Iwai, Ehime (JP); Junya Okawa, Ehime (JP)

(73) Assignees: Ehime Prefecture, Ehime (JP); Daio Paper Corporation, Ehime (JP)

( * ) Notice: Subject to any disclaimer, the term of this patent is extended or adjusted under 35 U.S.C. 154(b) by 699 days.

(21) Appl. No.: 17/761,858

(22) PCT Filed: Sep. 25, 2020

(86) PCT No.: PCT/JP2020/036309
§ 371 (c)(1),
(2) Date: Mar. 18, 2022

(87) PCT Pub. No.: WO2021/060480
PCT Pub. Date: Apr. 1, 2021

(65) Prior Publication Data
US 2022/0363933 A1  Nov. 17, 2022

(30) Foreign Application Priority Data

Sep. 27, 2019 (JP) ................. 2019-178013

(51) Int. Cl.
| | | |
|---|---|---|
| *C09D 101/02* | (2006.01) | |
| *B05D 3/02* | (2006.01) | |
| *B05D 7/00* | (2006.01) | |
| *B05D 7/24* | (2006.01) | |
| *B28B 11/00* | (2006.01) | |
| *B28B 11/04* | (2006.01) | |
| *B28B 11/24* | (2006.01) | |
| *C03C 17/00* | (2006.01) | |
| *C03C 17/28* | (2006.01) | |
| *C04B 41/00* | (2006.01) | |
| *C04B 41/45* | (2006.01) | |
| *C04B 41/48* | (2006.01) | |
| *C04B 41/52* | (2006.01) | |
| *C09D 7/40* | (2018.01) | |

(52) U.S. Cl.
CPC ......... *C09D 101/02* (2013.01); *B05D 3/0254* (2013.01); *B05D 7/24* (2013.01); *B05D 7/586* (2013.01); *B28B 11/001* (2013.01); *B28B 11/044* (2013.01); *B28B 11/243* (2013.01); *C03C 17/003* (2013.01); *C03C 17/28* (2013.01); *C04B 41/0072* (2013.01); *C04B 41/009* (2013.01); *C04B 41/4578* (2013.01); *C04B 41/4803* (2013.01); *C04B 41/524* (2013.01); *C09D 7/70* (2018.01); *C03C 2217/72* (2013.01); *C03C 2218/11* (2013.01); *C03C 2218/32* (2013.01)

(58) Field of Classification Search
CPC .......... B32B 1/02; B32B 17/08; B32B 23/10; Y10T 428/1352; C08L 97/005
See application file for complete search history.

(56) References Cited

U.S. PATENT DOCUMENTS

| | | | | |
|---|---|---|---|---|
| 4,994,112 A | * | 2/1991 | Majewicz | .............. D21H 19/52 106/774 |
| 2014/0050922 A1 | | 2/2014 | Chin et al. | |
| 2015/0191612 A1 | | 7/2015 | Van Engelen et al. | |

FOREIGN PATENT DOCUMENTS

| | | | |
|---|---|---|---|
| JP | 2004-345882 | | 12/2004 |
| JP | 2012-236811 | | 12/2012 |
| JP | 2014-015372 | | 1/2014 |
| JP | 2016094538 A | * | 5/2016 |
| JP | 2017-110130 | | 6/2017 |
| JP | 2019-172482 | | 10/2019 |
| KR | 10-2011-0098609 | | 9/2011 |
| WO | 2007/088974 | | 6/2009 |
| WO | 2013/042654 | | 3/2013 |
| WO | 2014/049207 | | 4/2014 |

OTHER PUBLICATIONS

Tappi, 2006.*
Dunn-Edwards, "What Is Paint Mode of?" (Year: 2013).*
Dr. Thomas Q. Hu, "Mechanical Pulp Bleaching" (Year: 2013).*
Machine translation of JP2016094538A (incl. paragraph numbers and figure 1) (Year: 2016).*
International Search Report for PCT/JP2020/036309, dated Dec. 1, 2020.

* cited by examiner

*Primary Examiner* — Amber R Orlando
*Assistant Examiner* — Ryan Patrick Loughran
(74) *Attorney, Agent, or Firm* — Andrus Intellectual Property Law, LLP

(57) ABSTRACT

Ceramics are capable of reducing color irregularities and uneven coating, hard to dissolve into glaze, and excellent in fixation. A water-based paint contains a coloring material, first cellulose nanofibers having a lignin content of 20 to 40 mass % and a water retention of 150 to 300%, and second cellulose nanofibers having a higher viscosity compared to the first cellulose nanofibers, and the water-based paint has a B-type viscosity of 600 cps or higher. Ceramic ware or glassware or the like having painting made on a green body of which surface is formed of silicic acid or silicate compound as a main component, with the water-based paint.

3 Claims, 4 Drawing Sheets

WATER-BASED PAINT, CERAMICS, AND METHOD OF DECORATION

CROSS-REFERENCE TO RELATED APPLICATIONS

This application is the U.S. national stage application of International Application PCT/JP2020/036309, filed Sep. 25, 2020, which international application was published on Apr. 1, 2021, as International Publication WO 2021/060480 in the Japanese language. The International Application claims priority of Japanese Patent Application No. 2019-178013, filed Sep. 27, 2019. The international application and Japanese application are both incorporated herein by reference, in entirety.

TECHNICAL FIELD

The present invention relates to water-based paint, ceramics, and a method of decoration.

BACKGROUND ART

Japanese and Western tableware, ornaments, or the like made of ceramics (for example, ceramic ware, glassware, enamelware, and the like) has conventionally been produced in the following process. An example of an underglaze decoration process includes a green body forming step, a first firing step (biscuit firing) involving drying and firing, then a first decoration step, a first glazing step involving glazing and drying, and a second firing step (glost firing). For overglaze decoration, this process is followed by a second decoration step involving painting, and a third firing step involving firing at a low temperature (800 to 900° C.), to produce the articles. Needless to say, when the ceramics to be produced are glassware, the first and the second firing steps may be skipped. Production of ceramics through the process discussed above requires skills, and particularly, the decoration work is often accompanied by difficulties.

Conventional techniques associated with ceramics decoration include decoration using a fixing material for water-based overglaze paint (Patent Literature 1) and decoration using water-based paint containing a water-soluble resin (Patent Literature 2).

Reference 1 discloses a technique of placing a fixing material on a glazed surface of a formed green body, so that the coloring with water-based paint is successfully achieved on the fixing material, to thereby allow decoration of predetermined quality. However, when the fixing material placed on the formed green body gives uneven surface, water-based paint, during coloring therewith, flows into depressed portions to generate color shading, which results in products having uneven coating, lacking sensuousness.

According to the specification of Reference 1, oil-based paint is used in this technique, and use of water-based paint is not specified. In addition, when water-based paint is used, the paint is repelled on the glaze layer (vitreous layer), which is a problem.

Reference 2 points out conventional difficulties in formation of a thin layer of pigment and its thickness control, when water-based paint (for example, inorganic pigment) is applied over the glaze and, for solving this problem, proposes use of water-based paint in which a particular resin is mixed with the pigment. It is reported that, according to this proposal, brushstrokes become smooth and control of the thickness of the water-based paint is facilitated. However, as this resin is hard to maintain the dispersed state in water-based paint for a prolonged period of time, color irregularities or non-uniform concentration of water-based paint may occur depending on the time period spent for the decoration work, which may cause deterioration of fixing property of the water-based paint.

According to this technique, design is painted after glazing and before firing, and is not painted on a vitrified, glaze layer. Thus, the design on the base is not visible after glazing and it is hard to paint another design over the already-painted design.

PRIOR ART PUBLICATION

Patent Literature

Patent Literature 1: JP 2014-15372 A
Patent Literature 2: JP 2004-345882 A

SUMMARY OF THE INVENTION

Problems to be Solved by the Invention

In this way, decoration work on ceramics is accompanied by difficulties, but the present inventors recognize that improvement in water-based paint allows easier decoration. One way to improve adhesion of water-based paint is to use paint containing a water-soluble thickener, such as carboxymethylcellulose (CMC). By mixing CMC, which improves thickness, in paint, impartment of adhesion to the paint may be expected. However, CMC, which is water soluble, may be dissolved into glaze to cause cracking.

Therefore, it is a primary object of the present invention to provide water-based paint which is capable of reducing color irregularities or uneven coating, hard to dissolve into glaze, and excellent in adhesion, as well as ceramics and a method of decoration therewith.

Means for Solving the Problem

Aspects for solving the above problems are as follows:

First Aspect

Water-based paint including:
a coloring base material,
first cellulose nanofibers having a lignin content of 20 to 40 mass % and a water retention of 150 to 300%, and
second cellulose nanofibers having a higher viscosity compared to the first cellulose nanofibers,
wherein the water-based paint having a B-type viscosity of 600 cps or higher.

During various tests for solving the above problems, the present inventors first focused on the viscosity of water-based paint. When a green body, such as a glass surface, or a glaze layer was subjected to overglaze decoration with a conventional water-based paint, the moisture contained in the water-based paint turned into water droplets due to surface tension, which caused concentration of the coloring base material dispersed in the water-based paint into droplets, resulting in poor spreading, color irregularities, or uneven coating of the water-based paint. In addition, conventional water-based paint had poor adhesion on green bodies. For example, when a first painting of a pattern was made with a brush, and a second painting was made thereon, the pattern of the first painting was sometimes displaced with the brush in the second painting. Further, when water-based paint is applied thickly, the thickly painted pattern was sometimes flaked off due to poor adhesion.

The water-based paint according to the present embodiment contains two types of cellulose nanofibers of different viscosities, which provides reduced color irregularities and uneven coating, and is excellent in adhesion. The reason for the expression of such properties is not known, but may be assumed as follows. Of the two types of cellulose nanofibers, the first cellulose nanofibers contain lignin. Lignin has a hydrophilic group, which increases affinity of the first cellulose nanofibers to water-based paint. In addition, as the first cellulose nanofibers have a particular water retention, sagging of the water-based paint is restricted. It is assumed that this improves the adhesion to a green body or a glass surface. As a result, the painted state of the water-based paint is maintained, and color irregularities or uneven coating are hard to occur.

Further, cellulose nanofibers having a relatively high viscosity are known to have many hydrogen bonding points, and have a thickening property (thixotropy). As the water-based paint according to the present embodiment contains cellulose nanofibers having a higher viscosity compared to the first cellulose nanofibers (referred to as second cellulose nanofibers), the painting, during making, is hard to bleed unexpectedly, and the paint is hard to sag. Consequently, color irregularities and uneven coating in the painting may be restricted even after firing, and unexpected generation of small bulges on the painting surface may be reduced. Unlike a water-soluble thickener, the water-based paint is not dissolved in water upon glazing, so that cracking after the firing may be avoided.

Second Aspect

The water-based paint according to the first embodiment, wherein a mass ratio of the first cellulose nanofibers:mass of the second cellulose nanofibers=99:1 to 51:49.

With the mass ratio within this range, the paint has the properties of a low water retention and a low B-type viscosity derived from the first cellulose nanofibers and a high viscosity derived from the second cellulose nanofibers, as well as excellent spreadability, and provides restricted color irregularities and uneven coating.

Third Aspect

The water-based paint according to the first or second embodiment, wherein a content of the second cellulose nanofibers is 0.02 to 1.9 mass %.

Water-based paint with too low a viscosity will result in sagging and poor adhesion, whereas water-based paint with too high a viscosity will result in poor spreadability and difficulties in painting. Paint containing an amount of the second cellulose nanofibers within the above range has a moderate viscosity and excellent spreadability and adhesion.

Fourth Aspect

The water-based paint according to the first embodiment, wherein a water retention of the second cellulose nanofibers is 250 to 400%.

With the water retention of the cellulose nanofibers within this range, excellent spreadability and adhesion are imparted to the water-based paint.

Fifth Aspect

Ceramics including a green body a surface of which is formed of silicic acid or a silicate compound, and a water-based paint layer coating on the green body and formed of the water-based paint according to any one of the first to fourth embodiments.

Ceramics in which color irregularities and uneven coating are restricted are provided.

Sixth Aspect

Glassware including:
a glassware green body, and
a glaze layer coating the glassware green body,
wherein the glaze layer including a fired water-based paint layer applied to the glassware green body and coated with glaze, the fired water-based paint layer being formed of the fired water-based paint according to any one of the first to fourth embodiments.

Seventh Aspect

Ceramic ware including:
a glazed ceramic ware green body, and
a glaze layer coating the ceramic ware green body,
wherein the glaze layer including a fired water-based paint layer applied to the glazed ceramic ware green body and coated with glaze, the fired water-based paint layer being formed of the fired water-based paint according to any one of the first to fourth embodiments.

Eighth Aspect

Enamelware including:
a glazed enamelware green body, and
a glaze layer coating the enamelware green body,
wherein the glaze layer including a fired water-based paint layer applied to the glazed enamelware green body and coated with glaze, the fired water-based paint layer being formed of the has been formed by glazing a fired water-based paint according to any one of the first to fourth embodiments.

Conventional water-based paint and glaze may sometimes have affinity to each other, and in such a case, painting with the paint may unintentionally bleed into the glaze layer. However, since the coloring base material in the water-based paint according to this embodiment is dispersed in a state being adhered to the cellulose nanofibers, ceramic ware or glassware with reduced bleeding is provided. Further, ceramic ware, glassware, or enamelware with restricted color irregularities or uneven coating is provided.

Ninth Aspect

The glassware according to the sixth embodiment, wherein the glaze layer is formed of a plurality of layers.

Tenth Aspect

The ceramic ware according to the seventh embodiment, wherein the glaze layer is formed of a plurality of layers.

Eleventh Aspect

The enamelware according to the eighth embodiment, wherein the glaze layer is formed of a plurality of layers.

As the water-based paint according to these embodiments has excellent adhesion to the glaze layer, further painting may be made with this water-based paint on a glazed surface of ceramic ware or glassware, and the applied paint is hard to flake. Thus, a plurality of turns of the painting and the coating on the painting with the glaze may be performed, which results in a plurality of overlapping glaze layers. In this way, ceramic ware, glassware, or enamelware having three-dimensional design with a depth may be provided.

Twelfth Aspect

A method of decoration comprising:
painting with the water-based paint according to any one of the first to fourth embodiment, on a green body a main component of which surface is silicic acid or a silicate compound, followed by drying, to obtain a first painted body, and
applying a glaze to the first painted body, followed by firing, to obtain a first glazed body.

The water-based paint according to this embodiment has excellent spreadability and easy to apply thinly by painting. The paint is also hard to sag and exhibit excellent adhesion even on a green body a main component of which surface is silicic acid or a silicate compound. Further, as the water-based paint has excellent adhesion, even the first painted body is glazed, the applied paint is hard to be displaced or flake.

Thirteenth Aspect

The method of decoration according to the twelfth embodiment, further comprising:
painting with the water-based paint on the first glazed body, followed by drying, to obtain a second painted body, and
applying a glaze to the second painted body, followed by firing, to obtain a second glazed body.
The effects similar to those in the ninth to eleventh embodiments may be obtained.

Fourteenth Aspect

The method of decoration according to the thirteenth embodiment, further comprising:
painting with the water-based paint on the second glazed body, followed by drying, to obtain a third painted body, and
applying a glaze to the third painted body, followed by firing, to obtain a third glazed body.
The effects similar to those in the ninth to eleventh embodiments may be obtained.

Effect of the Invention

According to the present invention, provided are water-based paint capable of reducing color irregularities and uneven coating, hard to dissolve into glaze, and excellent in adhesion, as well as ceramics and a method of decoration therewith.

EMBODIMENTS OF THE INVENTION

Figure 1:
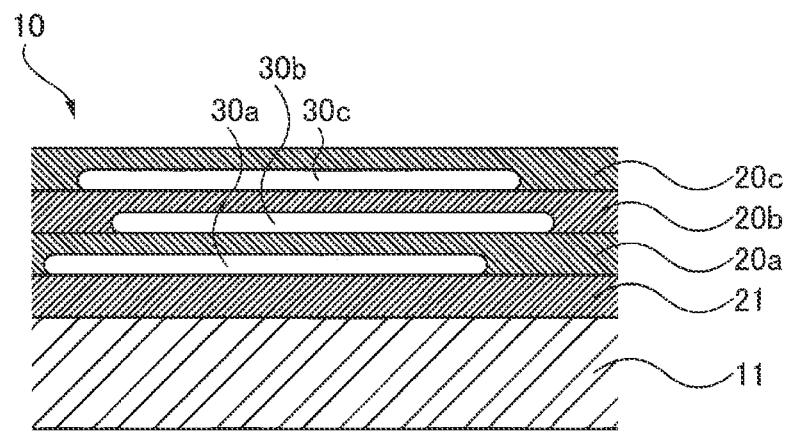
FIG. 1 is an explanatory view illustrating an embodiment.
Figure 2:
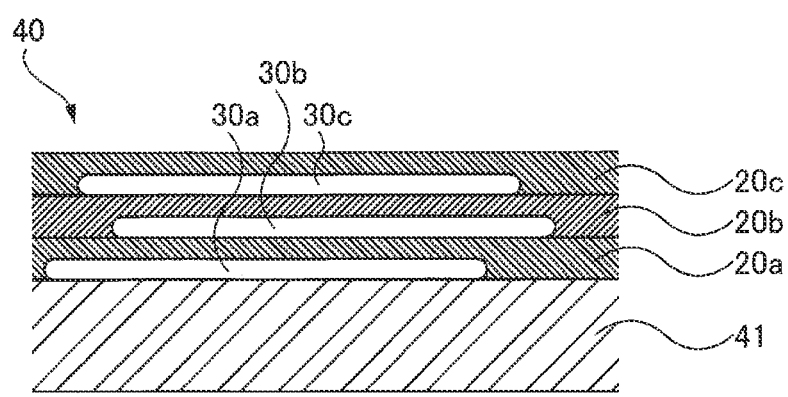
FIG. 2 is an explanatory view illustrating another embodiment.
Figure 3:
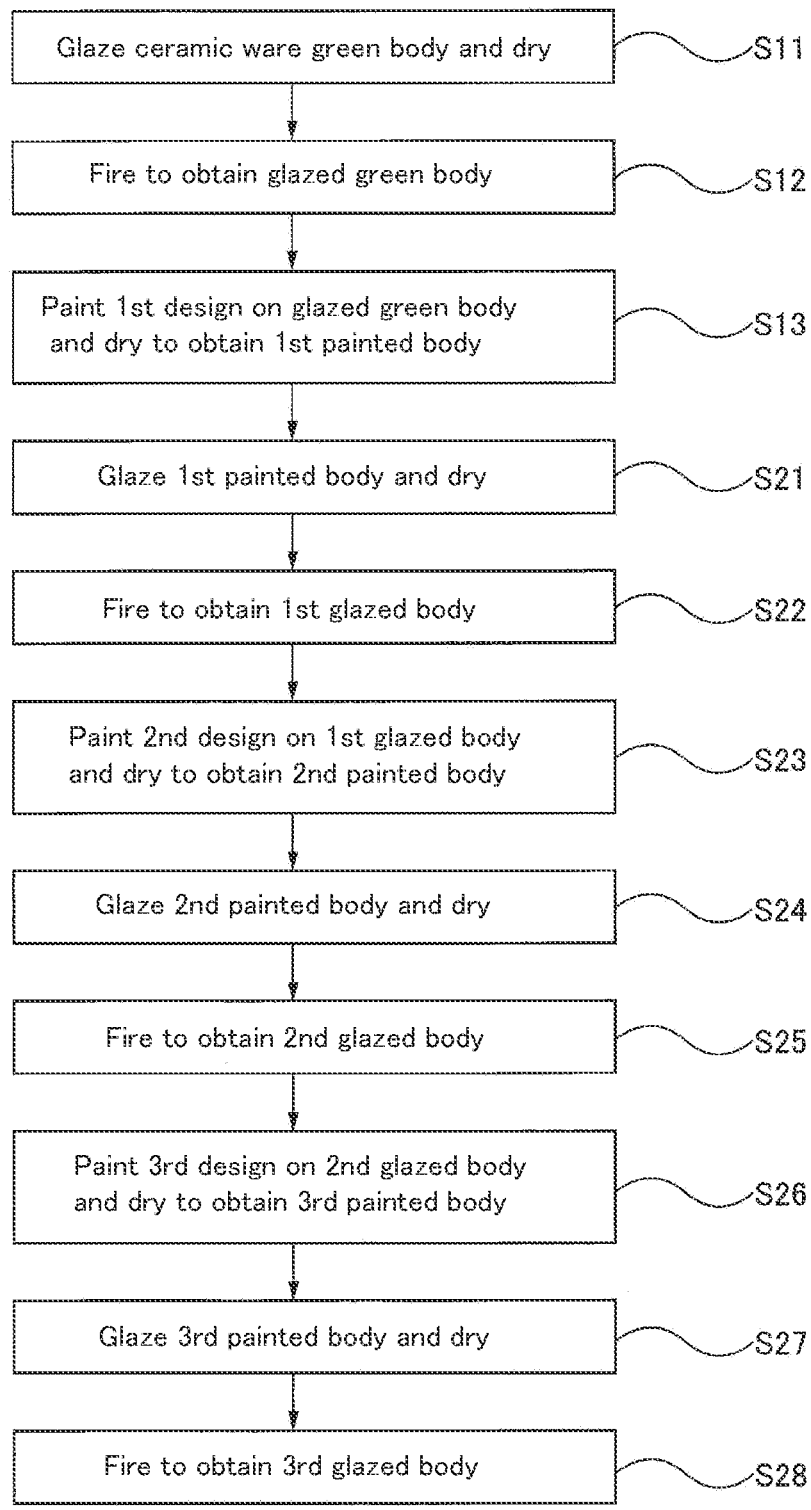
FIG. 3 is a chart showing an embodiment of a production flow.
Figure 4:
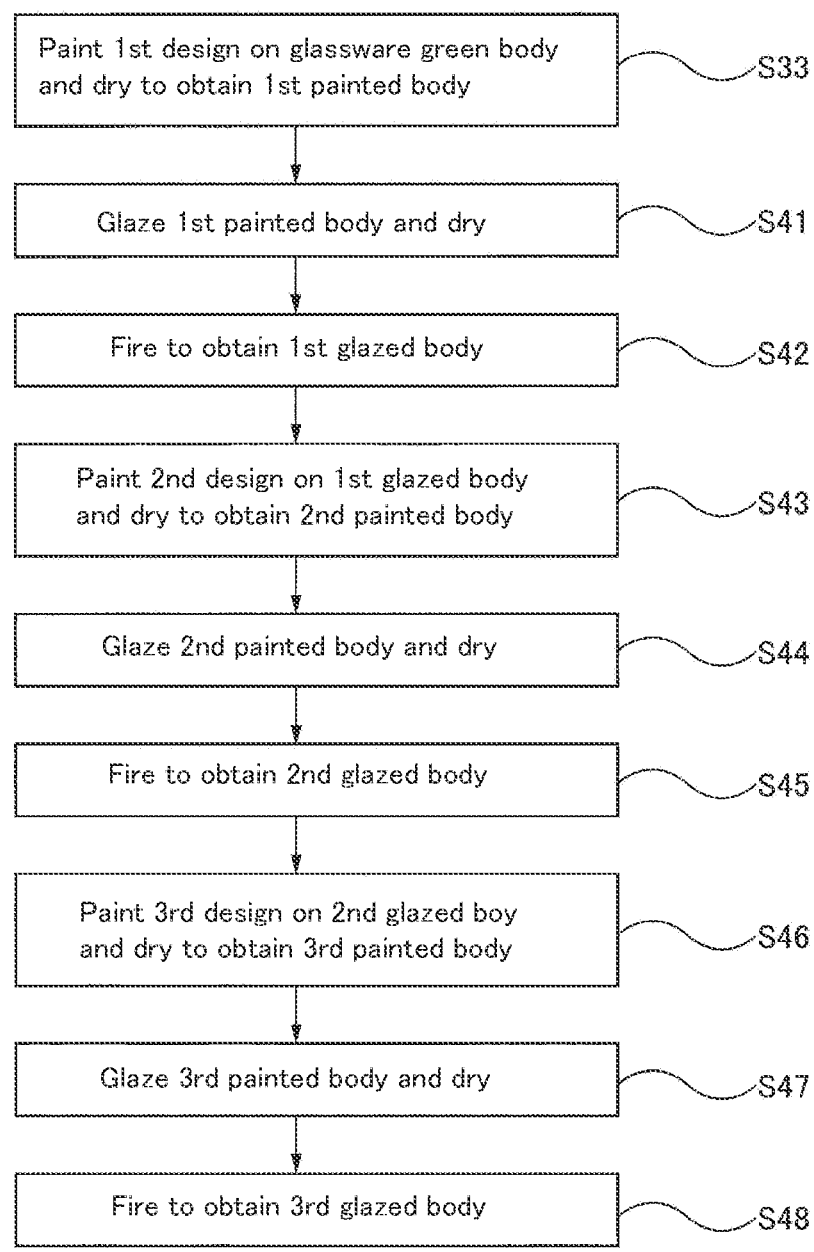
FIG. 4 is a chart showing another embodiment of a production flow.

Embodiments for implementing the present invention will now be explained. Note that the present embodiments are mere examples of the present invention. The scope of the present invention is not limited to the scope of the present embodiments.

Water-based paint presented as an example of an embodiment contains a coloring material, first cellulose nanofibers having a lignin content of 20 to 40 mass % and a water retention of 150 to 300%, and second cellulose nanofibers having a higher viscosity compared to the first cellulose nanofibers.

The present water-based paint may be prepared in the following manner as an example, but is not limited to this production. The water-based paint may be prepared by adding a coloring base material to a mixed solution of a 2 to 4% solution of the first cellulose nanofibers and a 1 to 2% solution of the second cellulose nanofibers, followed by stirring. Adjusting, such as adding water, may be made depending on the properties of the paint.

(Coloring Base Material)

Methods of decoration of pottery or porcelain, glassware, or enamelware (referred to also as ceramics hereinbelow) include overglaze decoration and underglaze decoration. The underglaze decoration is decoration before glazing, and may be performed in a known manner, for example, the following manner. A picture is painted on a biscuit-fired green body (such as a container) with the water-based paint, and then the resulting body is glazed and fired. The biscuit-fired green body generally has a rough surface, on which painting with water-based paint may be made successfully. The underglaze decoration may include a plurality of firing, but may require less work and lower production cost, for example, without second firing. Some pigments react with glaze, such as by dissolving into glaze. This reaction may cause bleeding or blurring of the painting. Intentional bleeding or blurring may be performed, but in order to avoid this reaction, water-based paint of metal chlorides or nitric compounds, which are pigments hard to react with glaze, may be used as a coloring base material.

The overglaze decoration may be performed in a known manner, for example, the following manner. First, a biscuit-fired green body is glazed, high-temperature fired, and then fired to form a glaze layer. The green body with the glaze layer formed thereon is called a glazed body. On the surface of the glazed body, picture is painted with a brush or the like, using a water-based paint. Then, the painted body may be low-temperature fired. As the firing is performed at a low temperature, the coloring material is preferably a coloring pigment. The pigment may be in various known colors, such as red, blue, yellow, or other colors, or even gilding.

The coloring base material includes a pigment and the like, as mentioned above. The pigment contained in the coloring base material may also be, other than the above, a solid solution in which another metal oxide or composite compound thereof is dissolved in silica, alumina, or a silica-alumina composite. The other metal oxide is not particularly limited, and may be, for example, cobalt oxide, iron oxide, copper oxide, manganese oxide, chromium oxide, nickel oxide, or tin oxide. The coloring base material may also include, for example, zirconium, silicon, praseodymium, vanadium, titanium, antimony, zinc, manganese, cobalt, nickel, aluminum, copper, lead, cadmium or compounds thereof, chromium or compounds thereof (e.g., oxide of chromium, viridian, cobalt turquoise, or ceramic pigments.

Ceramic pigments have excellent heat resistance, weatherability, and chemical resistance, and some are mainly made of oxides, composite oxides, silicates, or the like, but are not limited thereto. Examples of ceramic pigments may include, spinel solid solution, tin antimony gray, zircon gray, praseodymium yellow, tin vanadium yellow (Sn—V based, Sn—Ti—V based, or the like), zirconium vanadium yellow, peacock, Victoria green, chromium green (Al—Cr based), Prussian blue, matte blue, Co—Zn—Si based, Co—Si based, zirconium vanadium blue, chromium tin lilac, lilac, chromium tin pink, manganese pink, salmon pink, chromium alumina pink, and fire red.

The average particle size of the coloring base material according to the present embodiment may be, for example, 5 μm to 60 μm, preferably 5 μm to 40 μm. At over 60 μm, the coloring base material cannot cope with thin painting of the water-based paint. At below 5 μm, dispersibility of the pigment in the water-based paint may be insufficient to cause uneven coating.

When the main component of the green body, in particular in the surface thereof, is silicic acid or a silicate compound (for example, glass or other solid solution), production of the above-mentioned glazed body may be skipped, and a picture may be painted on this green body with a brush or the like, using a water-based paint. Then, the painted green body is subjected to low-temperature firing.

(Ceramics)

Green bodies of the ceramics include green bodies used in the production of ceramic ware or enamelware, and green bodies used in the production of glassware. The ceramic ware and the enamelware may include known ceramic ware and enamelware. For example, a green body mainly composed of at least one of clay, silica stone, feldspar, and mixtures thereof may be fired and used as a green body of ceramic ware or a green body of enamelware. Glassware may include known glass. For example, a green body mainly composed of at least one of silicic acid, silicate compounds, boric acid, boric compounds, phosphoric acid, phosphoric compounds, titanic acid, titanate compounds, tellurium, tellurium compounds, alumina, alumina compounds, and mixtures thereof may be used as a green body of glassware.

Green bodies a main component of which surface is silicic acid or a silicate compound may include green bodies of ceramic ware or enamelware glazed, dried, and fired; green bodies of glassware glazed, dried, and fired; green bodies of glassware as they are; and green bodies of glassware having an agar layer formed thereon.

(Cellulose Nanofibers)

Cellulose nanofibers have increased hydrogen bonding points, and therefore act to improve the strength of a formed body. Cellulose nanofibers may be obtained by defibration (making finer) of raw material pulp. The cellulose nanofibers may include cellulose nanofibers having a lignin content of 20 to 40 mass % and a water retention of 150 to 300% (i.e., first cellulose nanofibers), and cellulose nanofibers having a higher viscosity compared to the first cellulose nanofibers (i.e., second cellulose nanofibers). As used herein, simple reference to cellulose nanofibers applies to both the first cellulose nanofibers and the second cellulose nanofibers.

The present inventors have found out that a water-based paint containing only the first cellulose nanofibers, after being applied to a green body by painting, dried, and fired, has a lower surface strength, a lower applicability, i.e., viscosity, and may cause sagging, color irregularities, or uneven coating. The present inventors have found out that a water-based paint containing only the second cellulose nanofibers, after being applied to a green body by painting, dried, and fired, is too viscus and has a lower surface strength, and may cause partial blurring or poor spreadability in painting. The present inventors have also found out that, by preparing a water-based paint by mixing the first cellulose nanofibers and the second cellulose nanofibers at a particular ratio, a water-based paint having good spreadability and capable of reducing color irregularities and uneven coating, may be obtained.

As raw material pulp for the cellulose nanofibers, one or more members may be selected and used from the group consisting of wood pulp made from hardwood, softwood, or the like; non-wood pulp made from straw, bagasse, cotton, hemp, bast fibers, or the like; and de-inked pulp (DIP) made from recovered used paper, waste paper, or the like. These various raw materials may be in the form of a ground product, such as those referred to as cellulose powder.

In this regard, however, it is preferred to use wood pulp for avoiding contamination of impurities as much as possible. As the wood pulp, one or more members may be selected and used from the group consisting of chemical pulp, such as hardwood kraft pulp (LKP), softwood kraft pulp (NKP), sulfite pulp (SP), and dissolving pulp (DP), and mechanical pulp (TMP).

In the cellulose nanofibers according to the present embodiment, any of the above-mentioned pulp may be used. For example, mechanical pulp may be use as a raw material for the first cellulose nanofibers, while chemical pulp may be used as a raw material for the second cellulose nanofibers, which are not limited examples.

The hardwood kraft pulp may be hardwood bleached kraft pulp, hardwood unbleached kraft pulp, or hardwood semi-bleached kraft pulp. Similarly, the softwood kraft pulp may be softwood bleached kraft pulp, softwood unbleached kraft pulp, or softwood semi-bleached kraft pulp. The dissolving pulp may be, for example, those produced by sulfite pulping or kraft pulping, and may also include rayon pulp. It is prescribed that a lignin content of chemical pulp is less than 10 mass %. Here, the lignin content means a mass of lignin contained in the mass of solid pulp.

For good adhesion of the water-based paint applied by painting to a green body or a glaze layer, chemical pulp may preferably be used as the raw material pulp, whereas for bringing out bright colors of the coloring base material, bleached chemical pulp may preferably be used, and in particular, hardwood bleached kraft pulp (LBKP) may be more preferred.

As the mechanical pulp, one or more members may be selected and used from the group consisting of stone ground pulp (SGP), pressure stone ground pulp (PGW), refiner ground pulp (RGP), chemi-ground pulp (CGP), thermo-ground pulp (TGP), ground pulp (GP), thermomechanical pulp (TMP), chemithermomechanical pulp (CTMP), refiner mechanical pulp (RMP), and bleached thermomechanical pulp (BTMP). It is prescribed that a lignin content of mechanical pulp is 20 mass % or higher. Here, the lignin content means a percent by mass of lignin contained in the mass of solid pulp.

In view of spreadability of the water-based paint in painting or in view of firing, it is preferred to use pulp containing lignin, more preferably mechanical pulp, as the raw material pulp, whereas for bringing out bright colors of the coloring base material, it is more preferred to use bleached mechanical pulp, particularly preferred to use BTMP. With a higher spreadability of the water-based paint in painting, uneven coating, or color irregularities may be reduced, and small bulges on the surface of the fired formed body may be reduced, resulting in excellent sensuousness.

Prior to the defibration into the cellulose nanofibers, pretreatment may be performed by a chemical method. Such pretreatment by a chemical method may be, for example, hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), reduction of polysaccharides with a reducing agent (reduction treatment), oxidation with a TEMPO catalyst (oxidation treatment), or phosphoesterification (chemical treatment).

The enzyme treatment, acid treatment, or oxidation treatment prior to the defibration may result in a relatively low water retention and a higher homogeneity. In this regard, with too high a water retention of the cellulose nanofibers, the water-based paint is not very spreadable. This may be assumed to be because, as the water-based paint contains a lot of moisture, hydrogen bonding among water molecules results in aggregation thereof into droplets.

The enzyme treatment, acid treatment, or oxidation treatment of the raw material pulp causes decomposition of the amorphous region of hemicellulose and cellulose in the pulp, which leads to reduction of energy required for the treatment to make the raw material finer and improvement in uniformity and dispersibility of the cellulose fibers. The dispersibility of the cellulose fibers serves, for example, improvement in homogeneity of the formed body. The pretreatment, however, lowers the aspect ratio of cellulose nanofibers, and it is thus preferred to avoid excessive pretreatment.

The defibration of the raw material pulp may be effected by beating the raw material pulp in, for example, beaters, homogenizers, such as high-pressure homogenizers and high-pressure homogenizing apparatus, stone mill-type friction machines, such as grinders and grinding machines, single-screw kneaders, multi-screw kneaders, kneaders, refiners, and jet mills. It is preferred to use refiners or jet mills.

Regarding the defibration of raw material pulp, the preset inventors have found out that mechanical pulp is harder to be defibrated compared to chemical pulp, and mechanical pulp having a higher lignin content is proportionally harder to be defibrated.

The defibration of the raw material pulp is preferably effected so that the average fiber diameter, average fiber length, water retention, peak value of a pseudo particle size distribution curve of the resulting cellulose nanofibers, and the B-type viscosity of the water-based paint fall under the desired values or evaluations to be discussed below.

The average fiber diameter (average fiber width, or average of diameters of single fibers) of the first cellulose nanofibers is preferably 30 to 80 nm, more preferably 40 to 70 nm, particularly preferably 50 to 70 nm. With an average fiber diameter of the first cellulose nanofibers below 30 nm, the water retention of these cellulose nanofibers may be so high as to impair the spreadability of the water-based paint.

The average fiber diameter (average fiber width, or average of diameters of single fibers) of the second cellulose nanofibers is preferably 3 to 80 nm, more preferably 3 to 60 nm, particularly preferably 3 to 50 nm.

On the other hand, with an average fiber diameter of the first or second cellulose nanofibers over 80 nm, the effect in increase of hydrogen bonding points may not be obtained.

The average fiber diameter of the cellulose nanofibers may be adjusted by, for example, selection, pretreatment, or defibration of the raw material pulp.

The average fiber diameter of cellulose nanofibers may be determined by the following process.

First, 100 ml of an aqueous dispersion of cellulose nanofibers having a solid concentration of 0.01 to 0.1 mass % is filtered through a TEFLON (registered trademark) membrane filter, and subjected to solvent substitution once with 100 ml of ethanol and three times with 20 ml of t-butanol. Then the resulting mass is lyophilized and coated with osmium to obtain a sample. An electron microscopic SEM image of this sample is observed at a magnification of 3000 to 30000 folds, depending on the width of the constituent fibers. Specifically, two diagonal lines are drawn on the observation image, and three arbitrary straight lines passing the intersection of the diagonals are drawn. Then, the widths of a total of 100 fibers crossing these three straight lines are visually measured. The median diameter of the measured values is taken as the average fiber diameter.

The average fiber length (average of lengths of single fibers) of the cellulose nanofibers is preferably 200 to 1300 μm, more preferably 200 to 1000 μm, particularly preferably 200 to 800 μm. With an average fiber length below 200 μm, the cellulose nanofibers may be hard to be dispersed homogeneously in the water-based paint. Deterioration of the dispersibility causes color irregularities or uneven coating.

On the other hand, with an average fiber length of the cellulose nanofibers above 1300 μm, the fibers may easily entangle with each other, and adhesion between the fibers and the coloring base material is assumed to be relatively low, resulting in color irregularities or uneven coating of the water-based paint in intermediate formed bodies or products.

The average fiber length of the cellulose nanofibers may be adjusted by, for example, selection, pretreatment, or defibration of the raw material pulp.

The average fiber length of the cellulose nanofibers may be measured, in the same manner as for the average fiber diameter, by visually measuring the length of each fiber. The median length of the measured values is taken as the average fiber length.

The water retention of the first cellulose nanofibers is, for example 150% or higher, preferably 200% or higher, more preferably 220% or higher, particularly preferably 250% or higher. On the other hand, the water retention of the first cellulose nanofibers may be, for example, 300% or lower. With a water retention of the first cellulose nanofibers below 150%, dispersibility of the cellulose nanofibers may be impaired, which may lead to impairment of dispersibility of the coloring base material which adheres to these cellulose nanofibers. On the other hand, with a water retention of the cellulose nanofibers above 300%, water retention capability of the cellulose nanofibers themselves is too high, water molecules are formed into droplets, and a thin layer of the water-based paint is hard to be formed on a green body or a glaze layer.

The water retention of the second cellulose nanofibers is, for example 250% or higher, preferably 300% or higher, more preferably 320% or higher, particularly preferably 350% or higher. On the other hand, the water retention of the second cellulose nanofibers may be, for example, 400% or lower. With a water retention of the second cellulose nanofibers below 250%, dispersibility of the cellulose nanofibers may be impaired due to low moisture content, which may lead to impairment of dispersibility of the coloring base material which adheres to these cellulose nanofibers, and the water-based paint may not be applied smoothly by painting on a green body (or a glaze layer). On the other hand, with a water retention of the cellulose nanofibers above 400%, water retention capability of the cellulose nanofibers themselves is too high, water molecules are formed into droplets, and cracks or irregularities may be generated in the painting due to water evaporation in the drying step or the firing step.

The water retention of the cellulose nanofibers may be adjusted by, for example, selection, pretreatment, or defibration of the raw material pulp.

The water retention of the cellulose nanofibers is a value determined in compliance with JAPAN TAPPI No. 26 (2000).

The pseudo particle size distribution curve of the cellulose nanofibers has preferably one peak. With one peak, the cellulose nanofibers obtained by defibration of the same pulp have high uniformity in fiber length and fiber diameter, and dispersibility of the cellulose nanofibers in the water-based paint is excellent.

The peak value of the cellulose nanofibers is a value determined in compliance with ISO-13320 (2009). The cellulose nanofibers preferably have a single peak in a pseudo particle size distribution curve determined in the form of a water dispersion by laser diffraction. Such cellulose nanofibers having a single peak have been made sufficiently finer, and are capable of exhibiting good properties as cellulose nanofibers, so that the painting with the resulting water-based paint is preferably uniform. An embodiment is also preferred wherein the median diameter of the pseudo particle size distribution curve of the cellulose nanofibers having a single peak is, for example, 5 µm to 60 µm. With the cellulose nanofibers of the above-mentioned size, the cellulose nanofibers are moderately dispersed in the water-based paint to allow uniform painting with the water-based paint. The "pseudo particle size distribution curve" means a curve representing a volume-based particle size distribution determined using a particle size distribution measuring apparatus (for example, particle size distribution measuring apparatus LA-960S manufactured by HORIBA LTD.).

The mode of the particle size of the cellulose nanofibers and the median diameter of the pseudo particle size distribution may be adjusted by, for example, selection, pretreatment, or defibration of the raw material pulp.

The cellulose nanofibers obtained by the defibration may be kept in the form of a dispersion, as needed, prepared by dispersion in an aqueous medium, prior to mixing with the coloring base material. It is particularly preferred that the aqueous medium is entirely water (aqueous solution). However, part of the aqueous medium may be another liquid compatible with water. Such another liquid may be, for example, lower alcohols having 3 or less carbon atoms.

An embodiment is preferred wherein a mass ratio of the cellulose nanofibers contained in the water-based paint is, for example, the mass of the first cellulose nanofibers:the mass of the second cellulose nanofibers=99:1 to 51:49, preferably 90:10 to 51:49, more preferably 90:10 to 80:20. When the mass of the first cellulose nanofibers is too large with respect to the mass of the second cellulose nanofibers, the coloring base material is adhered dominantly to the first cellulose nanofibers, i.e., the coloring base material adhered to the second cellulose nanofibers is relatively less, which impairs adhesion of the coloring base material to a green body or a glaze layer. On the other hand, when the mass of the first cellulose nanofibers is too small with respect to the mass of the second cellulose nanofibers, spreadability of the paint upon painting is not good.

An embodiment is preferred wherein the water-based paint contains 0.02 to 1.9 mass %, preferably 0.4 to 1.9 mass % second cellulose nanofibers. Over 1.9 mass %, the viscosity of the water-based paint is too high to spread the paint upon painting. Below 0.02 mass %, the viscosity of the water-based paint is so low that the moisture in the water-based paint is easily formed into droplets, which makes uniform painting difficult.

An embodiment is also preferred wherein the lignin content of the first cellulose nanofibers is 20 to 40 mass %, more preferably 30 to 40 mass %, still more preferably 30 to 35 mass %. With a lignin content above this range, the paint may prone to separation into a hydrophilic component and a hydrophobic component due to hydrophobic property of lignin, resulting in color irregularities or uneven coating. With a lignin content below this range, it is assumed to be difficult for the first cellulose nanofibers to maintain the three-dimensional network structure, and the water retention of the first cellulose nanofibers is too high, which results in poor spreadability of the water-based paint.

It is assumed that in the paint containing the cellulose nanofibers and the coloring base material, the coloring base material is adhered to the cellulose nanofibers. Accordingly, moderate dispersion of the cellulose nanofibers in the water-based paint causes excellent dispersion of the coloring base material. An embodiment may be presented containing, for example, 0.02 to 0.04 parts by mass, more preferably 0.03 to 0.04 parts by mass of cellulose nanofibers (total of the first and second cellulose nanofibers) based on 1 part by mass of the coloring base material. Over 0.04 parts by mass, the amount of the cellulose nanofibers is too much compared to the coloring base material, so that the dispersibility of the coloring base material over the paint is insufficient. Below 0.02 parts by mass, the dispersibility of the coloring base material over the paint is not good, resulting in color irregularities of the paint.

Cellulose nanofibers have a chemical composition mainly of organic substances, with a slight amount of inorganic substances. Through the firing step, the organic components of cellulose nanofibers are lost.

An embodiment is preferred wherein the B-type viscosity of the water-based paint is, for example, 600 to 4000 cps, more preferably 1000 to 3000 cps, particularly preferably 2000 to 3000 cps. With the B-type viscosity over 4000 cps, spreadability of the paint upon painting is poor. Below 600 cps, the paint may run or sag from where it is applied by painting.

The viscosity of the second cellulose nanofibers is preferably higher than that of the first cellulose nanofibers. The viscosity may be determined in a known manner, for example, in terms of a B-type viscosity. The B-type viscosity of cellulose nanofibers may vary depending on the concentration of an aqueous dispersion of the cellulose nanofibers, kinds of wood, production method of cellulose nanofibers, or inherent viscosity of the cellulose nanofibers. For example, when the concentration of the aqueous dispersion of the first cellulose nanofibers is 1.5 to 4.0 mass %, the B-type viscosity of the cellulose nanofibers is 100 to 3000 cps.

Further, with an aqueous dispersion of cellulose nanofibers obtained by mechanical treatment of hardwood chemical pulp, when the concentration of the cellulose nanofibers is 1.5 to 2.0 mass %, the B-type viscosity thereof is 500 to 3000 cps. With an aqueous dispersion of phosphorous-esterified cellulose nanofibers or of TEMPO-oxidized cellulose nanofibers, when the concentration is 1.0 mass %, the B-type viscosity thereof is 10000 cps or higher. Thus, the B-type viscosity of the second cellulose nanofibers may suitably be adjusted to be higher than the B-type viscosity of the first cellulose nanofibers, by taking into account the concentration of the aqueous dispersion of the cellulose nanofibers, kinds of wood, production method of cellulose nanofibers, or inherent viscosity of the cellulose nanofibers. Note that, in general, chemical pulp is known to have a higher viscosity compared to mechanical pulp.
(Lignin)

The content of lignin may be adjusted by separately adding lignin to the cellulose nanofibers, followed by mixing, so as to be a desired mount, or by using lignin-containing pulp as the raw material pulp of the cellulose nanofibers or as pulp so as to be the above-mentioned amount, or by both. It is preferred to use lignin-containing pulp as the raw material pulp of the cellulose nanofibers or as pulp. With the lignin-containing pulp, water absorption of the cellulose nanofibers is lowered to keep the paint from becoming unnecessarily watery. Further, in the lignin-containing pulp, cellulose nanofibers per se and lignin are linked by chemical bonding and/or via physical adsorption, so that cellulose nanofibers contained in the paint may be dispersed to a desired extent. In addition, compared to the separate addition of lignin, the number of processes may be reduced, which allows to keep the costs low.

For separate addition of lignin, one or more members may be selected and used as lignin, from the group consisting of, for example, kraft lignin, sulfite lignin, soda lignin, Klason lignin, acid-soluble lignin, and milled wood lignin. It is preferred to use milled wood lignin, which is said to have a morphology and a chemical structure closest to those of the lignin inherently existing in plant fibers.

The lignin content is determined in compliance with lignin content percentage testing method (JAPAN TAPPI No. 61 (2000). The lignin content may also be determined in compliance with Determination of Kappa number (JIS P 8211 (2011)).

Note that lignin is known as thermoplastic (see, for example, JP 2012-236811 A), and it is assumed that when molding is performed at or above the melting point (according to the publication, the melting point is said to be 160 to 174° C.), molten lignin spreads all over the paint to reach homogeneity, and contributes to homogenization of the thickener, to thereby improve adhesion of the overall paint.
(Paint)

The paint may contain, in addition to the coloring material and the cellulose nanofibers, for example, silica stone powder ($SiO_2$ powder) added thereto. A mixture of these materials is dispersed in water substantially homogeneously to make the water-based paint.
(Glaze)

The glaze is vitreous and includes known compositions, and may contain, for example, ash (flux raw material), clay (adhesive material), feldspar (adhesive material, flux raw material, glass raw material), or silica stone (glass raw material). Ash is mainly composed of calcareous substances, such as calcium oxide, melt at high temperatures to vitrify, facilitates, as a flux material, melting of other components, and functions to improve fluidity of the glaze. Further, when a color-developing component (copper, iron, or the like) is contained, color-developing effect is imparted.

Chemical composition of the glaze may include silicic acid and silicate compounds, alumina and alumina compounds, potassium oxide and potassium oxide compounds, sodium oxide and sodium oxide compounds, and iron oxide and iron oxide compounds, and may further contain cadmium and cadmium oxides, lead and lead oxides, or the like. Silicic acid and silicate compounds are, in other words, the main components of the fired glaze, and may account for about 45 to 80% of the glaze, depending on the type of the glaze.

The glaze may have a composition to be described below, but is not limited thereto. In a ball mill, 35.4 wt % Fukushima feldspar, 18.6 wt % limestone, 17 wt % Korean kaolin, and 29 wt % silica stone are mixed with an equal amount of water, stirred, subjected to deironation through a sieve, adjusted by adding water to a particular specific gravity, to thereby prepare glaze A. Further, 3 g of CMC is added to and dissolved in 297 g of this glaze A to obtain glaze B.
(Production of Ceramic Ware and Enamelware)

When the green body is a green body of ceramic ware (referred to sometimes as ceramic ware green body 11 hereinbelow), the ceramic ware green body 11 is glazed, dried at a room temperature to 105° C. (production step S11), and fired at 1200 to 1300° C. to obtain a green body of which surface is coated with a vitreous glaze layer 21 (sometimes referred to as glazed green body) (production step S12). In this way, the ceramic ware green body 11 is given the coated surface of which main component is silicic acid or a silicate compound. The firing is performed under the conditions that, for example, the temperature is raised up to 950° C. over 9 hours and 30 minutes, then up to 1250° C. over 5 hours, maintained at 1250° C. for 30 minutes, and then naturally cooled.

When the green body is a green body of enamelware (referred to sometimes as enamelware green body hereinbelow), the enamelware green body is glazed, dried at a room temperature to 105° C. (production step S11), and fired at 1200 to 1300° C. to obtain a green body of which surface is coated with a vitreous glaze layer 21 (sometimes referred to as glazed green body) (production step S12). In this way, the enamelware green body is given the coated surface of which main component is silicic acid or a silicate compound. The firing is performed under the conditions that, for example, the temperature is raised up to 950° C. over 9 hours and 30 minutes, then up to 1250° C. over 5 hours, maintained at 1250° C. for 30 minutes, and then naturally cooled.

The glazing may be performed all over the green body surface, or partially. Though crazing may occur, coating all over the green body surface is preferred. Moisture is hard to soak the glaze layer. Further, application of dispersion of glaze dispersed in water or the like to the green body is also included in the glazing (here, in the production of ceramic ware or enamelware, a green body may refer to the "ceramic ware green body 11 or enamelware green body").
<Single Layer>

On the obtained glazed green body, a first design 30a is painted with the water-based paint and dried, for example, at 60 to 105° C. for 1 hour to obtain a first painted body (production step S13).

The first painted body is soaked in a glaze liquid to glaze the design, dried again at, for example, 60 to 105° C. for 1 hour (production step S21), and fired at 1220° C., to thereby coat the fired water-based paint with the glaze to form a glaze layer 20a. That is, the glaze layer 20a is formed by coating the water-based paint with the glaze and firing them, and the first painted body is coated with the glaze layer 20a to form a first glazed body (production step S22). The firing is performed under the conditions that, for example, the temperature is raised up to 950° C. over 9 hours and 30 minutes, then up to 1220° C. over 5 hours, maintained at 1220° C. for 30 minutes, and then naturally cooled. The first glazed body may be a final product, but may further form one or more glaze layers on the first glazed body to produce ceramic ware or enamelware with a plurality of layers. The production technique is discussed below.

Hitherto, the surface of the first glazed body, i.e., the surface of the glaze layer was very smooth, and if a water-based paint was painted on this surface, the surface repels the water-based paint, which was hard to be fixed on the surface. However, the paint containing the cellulose nanofibers is ready to fix on the surface, and thus hard to be repelled on the surface, and becomes hydrophilic after drying, so that the glaze (dispersed in water) may be applied thereon easily. This allows the painting with the paint and the subsequent glazing.

As a method of painting on the surface of the glaze layer, overglaze decoration is known, wherein a glaze layer cannot be formed over the design surface. It is known that this causes poor durability and easy color fading through repeated washing in a dishwasher.

<Plurality of Layers>

On the above-mentioned first glazed body, a second design 30b is painted with the water-based paint and dried, for example, at 60 to 105° C. for 1 hour to obtain a second painted body (production step S23).

The second painted body thus obtained is glazed, dried, for example, at 60 to 105° C. for 1 hour (production step S24), and fired, to thereby coat the fired water-based paint with the glaze to form a glaze layer 20b. That is, the glaze layer 20b is formed by coating the water-based paint with the glaze and firing them, and the second painted body is coated with the glaze layer 20b to form a second glazed body (production step S25). The conditions of the firing may be, for example, the same as those in the production step S22.

On the second glazed body, a third design 30c is painted with the water-based paint and dried, for example, at 60 to 105° C. for 1 hour to obtain a third painted body (production step S26).

The third painted body thus obtained is soaked in a glaze liquid to glaze the third design 30c, dried, for example, at room temperature to 105° C. for 1 hour (production step S27), and fired at 1220° C., to thereby coat the fired water-based paint with the glaze to form a glaze layer 20c. That is, the glaze layer 20c is formed by coating the water-based paint with the glaze and firing them, and the third painted body is coated with the glaze layer 20c to form a third glazed body (production step S28). The conditions of the firing may be, for example, the same as those in the production step S22.

The second glazed body or the third glazed body produced through the series of steps discussed above may be the ceramic ware 10 or enamelware as produced. The ceramic ware or enamelware thus produced has, from the green body surface outwards, the first design 30a, the second design 30b, and the third design 30c, with each intervening glaze layer therebetween. Thus, ceramic ware or enamelware having a deep design may be enjoyed.

The production process of ceramic ware or enamelware having three overlaid glaze layers has been discussed above, but the designs and the glaze layers are not limited to three respective layers, and may be overlaid in four or more respective layers. In this way, ceramic ware or enamelware having a plurality of glaze layers may be obtained.

(Production of Glassware)

<Single Layer>

When the green body is a green body of glassware (referred to sometimes as glassware green body 41 hereinbelow), the glassware green body 41 is glazed, dried at 60 to 105° C., and fired to obtain a green body of which surface is coated with a vitreous glaze layer 21 (sometimes referred to as glazed green body). However, when the green body is a glassware green body 41, this step may be skipped. That is, a design may be painted directly on the glassware green body 41 with the water-based paint. Needless to say, the main component of the glassware green body 41 is silicic acid and silicate compound, and the main component of the surface of the glassware green body 41 is also silicic acid and silicate compound.

Incidentally, on the surface of the glassware green body 41, for example, a 0.1 to 3.0% aqueous agar solution may be applied, and dried at 60 to 105° C. for 1 hour to form an agar layer, to thereby obtain a glassware green body coated with an agar layer. In this case, painting may be made on this agar layer with the water-based paint. Since the adhesion between the agar layer and the cellulose nanofibers is excellent, painting with the water-based paint may easily be made.

On the glazed green body or glassware green body 41, a first design 30a is painted with the water-based paint and dried, for example, at 60 to 105° C. for 1 hour to obtain a first painted body (production step S33).

The first painted body is soaked in a glaze liquid to glaze the design, dried again at, for example, 60 to 105° C. for 1 hour (production step S41), and fired at 580 to 780° C., to thereby coat the fired water-based paint with the glaze to form a glaze layer 20a over the surface of the first painted body. That is, the glaze layer 20a is formed by coating the fired water-based paint with the glaze, and the first painted body is coated with the glaze layer 20a to form a first glazed body (production step S42). The firing is performed under the conditions that, for example, the temperature is raised up to 550° C. over 5 hours and 30 minutes, then up to 780° C. over 5 hours, maintained at 780° C. for 30 minutes, and then naturally cooled. The first glazed body may be a final product, but may further form one or more glaze layers on the first glazed body to produce glassware with a plurality of layers. The production technique is discussed below.

<Plurality of Layers>

On the above-mentioned first glazed body, a second design 30b is painted with the water-based paint and dried, for example, at 60 to 105° C. for 1 hour to obtain a second painted body (production step S43).

The second painted body thus obtained is soaked in a glaze liquid to glaze the second design 30b, dried, for example, at 60 to 105° C. for 1 hour (production step S44), and fired at 1200 to 1300° C., to thereby coat the fired water-based paint with the glaze to form a glaze layer 20b. That is, the glaze layer 20b is formed by coating the water-based paint with the glaze and firing them, and the second painted boy is coated with the glaze layer 20b to form a second glazed body (production step S45). The conditions of the firing may be, for example, the same as those in the production step S22.

On the second glazed body, a third design 30c is painted with the water-based paint and dried, for example, at 60 to 105° C. for 1 hour to obtain a third painted body (production step S46).

The third painted body thus obtained is soaked in a glaze liquid to glaze the third design 30c, dried, for example, at 60 to 105° C. for 1 hour (production step S47), and fired at 580 to 780° C., to thereby coat the fired water-based paint with the glaze to form a glaze layer 20c. That is, the glaze layer 20c is formed by coating the water-based paint with the glaze and firing them, and the third painted body is coated with the glaze layer 20c to form a third glazed body (production step S48). The conditions of the firing may be, for example, the same as those in the production step S22.

The second glazed body or the third glazed body produced through the series of steps discussed above may be the glassware 40 as produced.

The glassware thus produced has, from the green body surface outwards, the first design 30a, the second design 30b, and the third design 30c, with each intervening glaze layer therebetween. Thus, glassware having a deep design may be enjoyed.

The production process of glassware having three overlaid glaze layers have been discussed above, but the designs and the glaze layers are not limited to three respective layers, and may be overlaid in four or more respective layers. In this way, glassware having a plurality of glaze layers may be obtained.

Further, with this water-based paint, further design may be painted on existing ceramics afterward through the procedure discussed above.

EXAMPLES (Formula of Paint)

Example 1

Paint was prepared by mixing 1.0 g of pigment (Green M-142), 0.8 g of cellulose nanofibers (bleached mechanical pulp product) (3% by weight aqueous dispersion), and 0.2 g of cellulose nanofibers (bleached hardwood pulp product, high viscosity CNF) (2% by weight aqueous dispersion), which was taken as Example 1. With regard to the cellulose nanofibers, the bleached mechanical pulp product was beaten in a Niagara beater or a single disk refiner until 80% or more of the product was fine fibers, to obtain a processed material, which was then circulated in a high-pressure homogenizer three to ten times for making the material finer, to thereby obtain first cellulose nanofibers having an average fiber width of 50 nm, a water retention of 243%, a lignin content of 30.9%, and a B-type viscosity of 590 cps. Second cellulose nanofibers have an average fiber width of 31 nm, a water retention of 355%, a lignin content of 1.8%, and a B-type viscosity of 2700 cps.

Example 2

Paint was prepared by mixing 1.0 g of pigment (Green M-142, NITTO GANRYO KOGYO CO., LTD.), 0.9 g of cellulose nanofibers (bleached mechanical pulp product) (3% by weight aqueous dispersion), 0.1 g of cellulose nanofibers, which had been obtained by phosphorous-esterification of a bleached hardwood pulp product, and had an average fiber width of 3 to 4 nm, and a B-type viscosity of 19000 cps (phosphorous-esterified, high viscosity CNF) (1% by weight aqueous dispersion), which was taken as Example 2.

Example 3

Paint was prepared by mixing 1.0 g of pigment (Green M-142, NITTO GANRYO KOGYO CO., LTD.), 0.8 g of cellulose nanofibers (bleached mechanical pulp product) (3% by weight aqueous dispersion), 0.2 g of cellulose nanofibers, which had been obtained by phosphorous-esterification of a bleached hardwood pulp product, and had an average fiber width of 3 to 4 nm, and a B-type viscosity of 19000 cps (phosphorous-esterified, high viscosity CNF) (1% by weight aqueous dispersion), which was taken as Example 3.

Example 4

Paint was prepared by mixing 1.0 g of pigment (Green M-142, NITTO GANRYO KOGYO CO., LTD.), 0.9 g of cellulose nanofibers (bleached mechanical pulp product) (3% by weight aqueous dispersion), 0.1 g of cellulose nanofibers, which had been obtained by subjecting a bleached hardwood pulp product to TEMPO oxidation, and had an average fiber width of 3 to 4 nm, (TEMPO-oxidized, high viscosity CNF) (1% by weight aqueous dispersion), which was taken as Example 4.

Example 5

Paint was prepared by mixing 1.0 g of pigment (Green M-142, NITTO GANRYO KOGYO CO., LTD.), 0.8 g of cellulose nanofibers (bleached mechanical pulp product) (3% by weight aqueous dispersion), 0.2 g of cellulose nanofibers (TEMPO-oxidized, high viscosity CNF) (1% by weight aqueous dispersion), which was taken as Example 5.

Comparative Example 1

Paint was prepared by mixing 1.0 g of pigment (Green M-142, NITTO GANRYO KOGYO CO., LTD.), 0.5 g of cellulose nanofibers (bleached mechanical pulp product, high viscosity CNF) (3% by weight aqueous dispersion), and 0.5 g of cellulose nanofibers (bleached hardwood pulp product) (2% by weight aqueous dispersion), which was taken as Comparative Example 1. The cellulose nanofibers had been defibrated in the same way as in Example 1. That is, the bleached mechanical pulp product was beaten in a Niagara beater or a single disk refiner until 80% or more of the product was fine fibers, to obtain a processed material, which was then circulated in a high-pressure homogenizer three to ten times for making the material finer, to thereby obtain the cellulose nanofibers.

Comparative Example 2

Paint was prepared by mixing 1.0 g of pigment (Green M-142, NITTO GANRYO KOGYO CO., LTD.), 0.2 g of cellulose nanofibers (bleached mechanical pulp product) (3% by weight aqueous dispersion), and 0.8 g of cellulose nanofibers (bleached hardwood pulp product, high viscosity CNF) (2% by weight aqueous dispersion), which was taken as Comparative Example 1. The cellulose nanofibers had been defibrated in the same way as in Example 2

(Application Test)

Each paint prepared above (Examples 1 to 5, Comparative Examples 1 and 2) was applied to a tile to obtain an applied product. Each applied product was dried at 105° C. for 1 hour, and naturally cooled down to ordinary temperature. Then, the cooled applied product (referred to also as a sample) was evaluated for viscosity, B-type viscosity, surface strength, and applicability. The results are shown in Table 1.

Regarding the evaluation, samples having a B-type viscosity (cp) of 600 cps or higher were rated as having a "0" viscosity, whereas those having a B-type viscosity of lower than 600 cps were rated as having a "X" viscosity. This is based on the viscosity of the 2% cellulose nanofibers of the bleached mechanical pulp product being about 500 cps.

Evaluation of the surface strength was made by generally termed Cello-pick test. Specifically, an adhesive cellophane tape of 18 mm wide was adhered tightly on a part of the painting surface portion of a sample and pressed with a roller having a self-weight of 200 g on the back surface of the adhesive cellophane tape so as not to entrain air over the painting surface portion of the sample, and subsequently peeled off. The mark of the paint adhered to the peeled adhesive cellophane tape was evaluated under the conditions below. An area percentage of the paint adhered to the adhesive cellophane tape based on the overall point being 0% or higher and less than 20% was rated as "O", an area percentage of 30% or higher and less than 50% was rated as "Δ", and an area percentage of 50% or higher was rated as "X".

Applicability was evaluated by applying in circle a paint adhered on a brush to a smooth tile. Samples resulting in no uneven coating (i.e., blur) when applied at 3 cm/second was evaluated as "O", those resulting in no uneven coating (i.e., blur) when applied at 2 cm/second was evaluated as "Δ", and those resulting in no uneven coating (i.e., blur) when applied at 1 cm/second was evaluated as "X".

The results of the application test are shown in Table 1.

The room temperature refers to the temperature in houses in general, and is, for example, 1 to 30° C., more preferably 15 to 25° c.

The B-type viscosity of a dispersion (or aqueous dispersion) of cellulose nanofibers (1% solid concentration) is determined in compliance with JIS-Z8803 (2011) "Methods for viscosity measurement of liquid". The B-type viscosity is a resistance torque in stirring a dispersion, and a higher value means more energy required for the stirring.

INDUSTRIAL APPLICABILITY

The present invention is applicable as a water-based paint, ceramics, and a method of decoration.

TABLE 1

| | Bleached mechanical pulp product CNF | | High viscosity CNF | | | Result of evaluation | | | |
| --- | --- | --- | --- | --- | --- | --- | --- | --- | --- |
| | Content (%) | Concentration (%) | Content (%) | Concentration (%) | Production method | Viscosity | B-type viscosity (cp) | Surface strength | Applicability |
| Example 1 | 80 | 2 | 20 | 2 | LBKP mechanical processing | O | 760 | O | O |
| Example 2 | 90 | 2 | 10 | 1 | Phosphorous-esterification | O | 890 | O | O |
| Example 3 | 80 | 2 | 20 | 1 | Phosphorous-esterification | O | 1210 | O | O |
| Example 4 | 90 | 2 | 10 | 1 | TEMPO-oxidation | O | 980 | O | O |
| Example 5 | 80 | 2 | 20 | 1 | TEMPO-oxidation | O | 1230 | O | O |
| Comparative Example 1 | 50 | 2 | 50 | 2 | LBKP mechanical processing | O | 1250 | Δ | Δ |
| Comparative Example 2 | 20 | 2 | 80 | 2 | LBKP mechanical processing | O | 2700 | X | X |

In Examples 1 to 5, good results were obtained in viscosity of the paint, surface strength, and evaluation of applicability to tile. In Comparative Examples 1 and 2, good results were not obtained in surface strength and applicability to tile.

The cellulose nanofibers used in the Examples (bleached mechanical pulp product) are made from mechanical pulp, which has a higher lignin content compared to other types of pulp. Further, cellulose nanofibers made from mechanical pulp have a relatively larger average fiber diameter compared to cellulose nanofibers made from other types of pulp, so that the water retention and the B-type viscosity of the cellulose nanofibers made from mechanical pulp are lower, and paints containing such cellulose nanofibers spread well.

The present invention is not limited to the embodiments discussed above, and various modifications may be made without departing from the gist of the present invention.

The cellulose nanofibers may be in any form, such as powder, paste, or slurry, and the medium in which the cellulose nanofibers are dispersed is not limited to water, and may be organic solvents or other fluids as may be suitable.

(Others)

The centrifuge used herein was HITATHI cooling centrifuge CR22N.

The average particle size of pigment and the like were measured in compliance with JIS Z 8825: 2013.

An embodiment wherein both the first and second cellulose nanofibers are bleached is preferred since the coloring material to be mixed with these cellulose nanofibers is not discolored and takes on its inherent color.

DESCRIPTION OF REFERENCE NUMERALS

10: ceramic ware
11: ceramic ware green body
20a: glaze layer
20b: glaze layer
20c: glaze layer
21: glaze layer
30a: first design
30b: second design
30c: third design
40: glassware
41: glassware green body

The invention claimed is:

1. A water-based paint comprising:
a coloring base material;
first cellulose nanofibers having a lignin content of 20 to 40 mass % and a water retention of 150 to 300%; and
second cellulose nanofibers made from chemical pulp and having a higher B-type viscosity compared to the first cellulose nanofibers, as measured in a form of an aqueous dispersion of cellulose nanofibers at 1% solid concentration,
wherein the water-based paint has a B-type viscosity of 600 cps or higher, and
wherein a mass ratio of the first cellulose nanofibers to the second cellulose nanofibers ranges from 99:1 to 51:49.

2. The water-based paint according to claim 1, wherein a content of the second cellulose nanofibers is 0.02 to 1.9 mass %.

3. The water-based paint according to claim 1, wherein a water retention of the second cellulose nanofibers is 250 to 400%.

\* \* \* \* \*